(12) United States Patent
Correia et al.

(10) Patent No.: US 10,005,363 B1
(45) Date of Patent: Jun. 26, 2018

(54) VEHICLE POWER FLOW ANALYSIS TO DISTINGUISH BETWEEN INTERNAL FAULTS AND EXTERNAL FORCES

(71) Applicant: GM Global Technology Operations LLC, Detroit, MI (US)

(72) Inventors: Josef J. Correia, Doral, FL (US); Jeong J. Park, Ann Arbor, MI (US); Helen M. Rieland, Troy, MI (US); Richard A. Kulas, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/442,100

(22) Filed: Feb. 24, 2017

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60L 3/04* | (2006.01) |
| *B60L 3/00* | (2006.01) |

(52) U.S. Cl.
CPC ............ *B60L 3/04* (2013.01); *B60L 3/0007* (2013.01); *B60L 3/0061* (2013.01)

(58) Field of Classification Search
CPC ......... B60L 3/04; B60L 3/0007; B60L 3/0061
USPC .......................................................... 701/22
See application file for complete search history.

(56) References Cited

U.S. PATENT DOCUMENTS

| | | | | |
|---|---|---|---|---|
| 2001/0048226 | A1* | 12/2001 | Nada ...................... | F02N 11/04 290/40 C |
| 2003/0034754 | A1* | 2/2003 | Sethi ....................... | G05G 1/30 318/801 |

* cited by examiner

*Primary Examiner* — Mahmoud S Ismail
(74) *Attorney, Agent, or Firm* — Harness, Dickey & Pierce, P.L.C.

(57) ABSTRACT

A method of analyzing vehicle parameters to distinguish between whether an unexpected vehicle acceleration is due to an internal fault or external forces. The method uses a magnitude and direction of a change in acceleration for evaluating whether the unexpected acceleration is due to a potential system fault scenario or a potential crash scenario.

3 Claims, 2 Drawing Sheets

VEHICLE POWER FLOW ANALYSIS TO DISTINGUISH BETWEEN INTERNAL FAULTS AND EXTERNAL FORCES

FIELD

The present disclosure relates to vehicle power flow analysis to distinguish between internal faults and external forces.

BACKGROUND

This section provides background information related to the present disclosure which is not necessarily prior art.

Electric vehicles have become increasingly popular. The cost to recharge the vehicle batteries is significantly less than the cost of fuel for powering a conventional vehicle having an internal combustion engine. In addition, electric vehicles may reduce the amount of harmful emissions that are associated with conventional internal combustion engines.

SUMMARY

This section provides a general summary of the disclosure, and is not a comprehensive disclosure of its full scope or all of its features.

Because electric vehicles employ a relatively new technology advancement, the need still exists for providing the electric vehicle with improved controls to distinguish between internal faults and external forces. In particular, the present disclosure provides a method of analyzing vehicle parameters to distinguish between whether an unexpected vehicle acceleration is due to an internal fault or external forces. The method uses a magnitude and direction of a change in acceleration for evaluating whether the unexpected acceleration is due to a potential system fault scenario or a potential crash scenario and then taking measures accordingly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
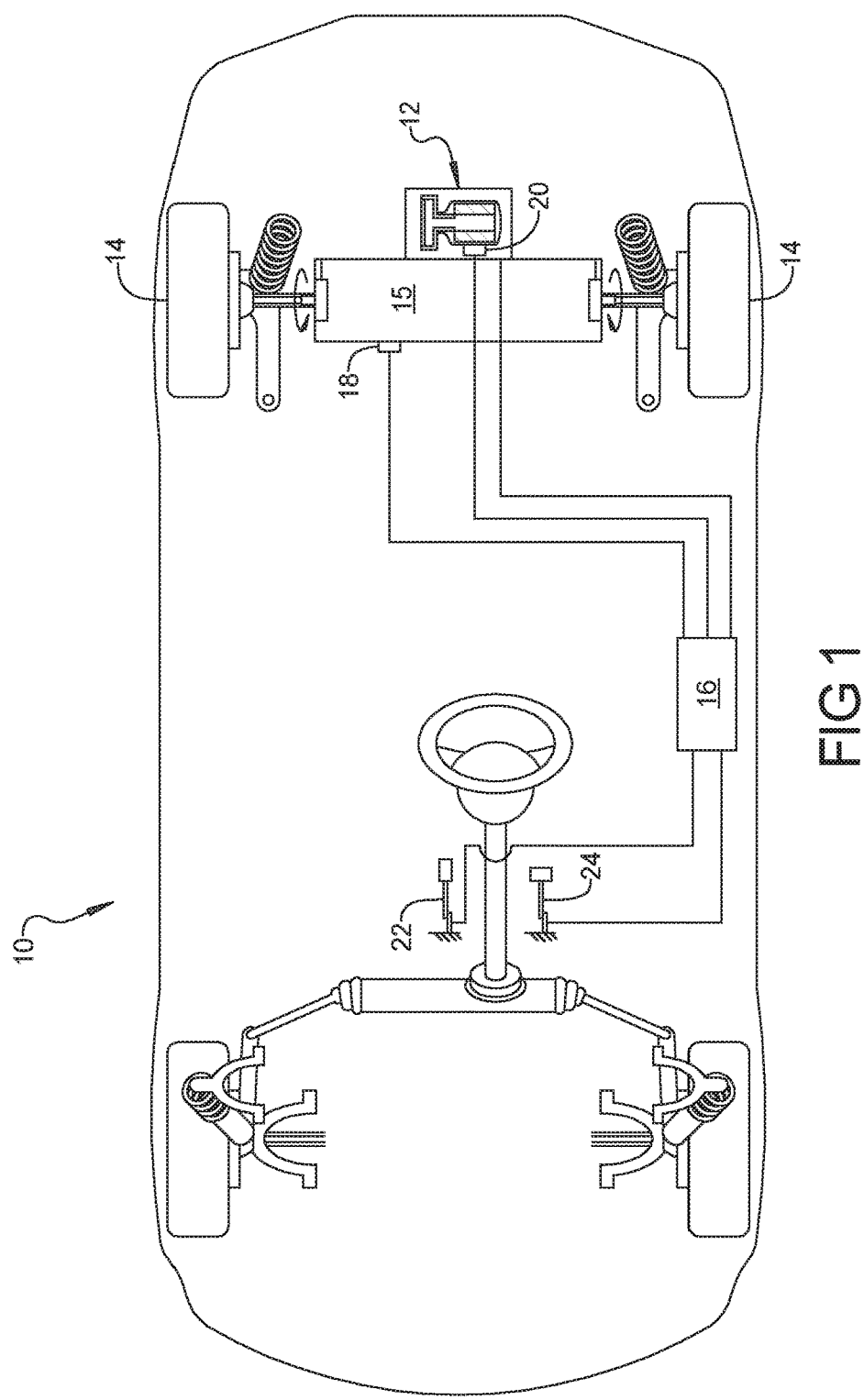
Figure 2:
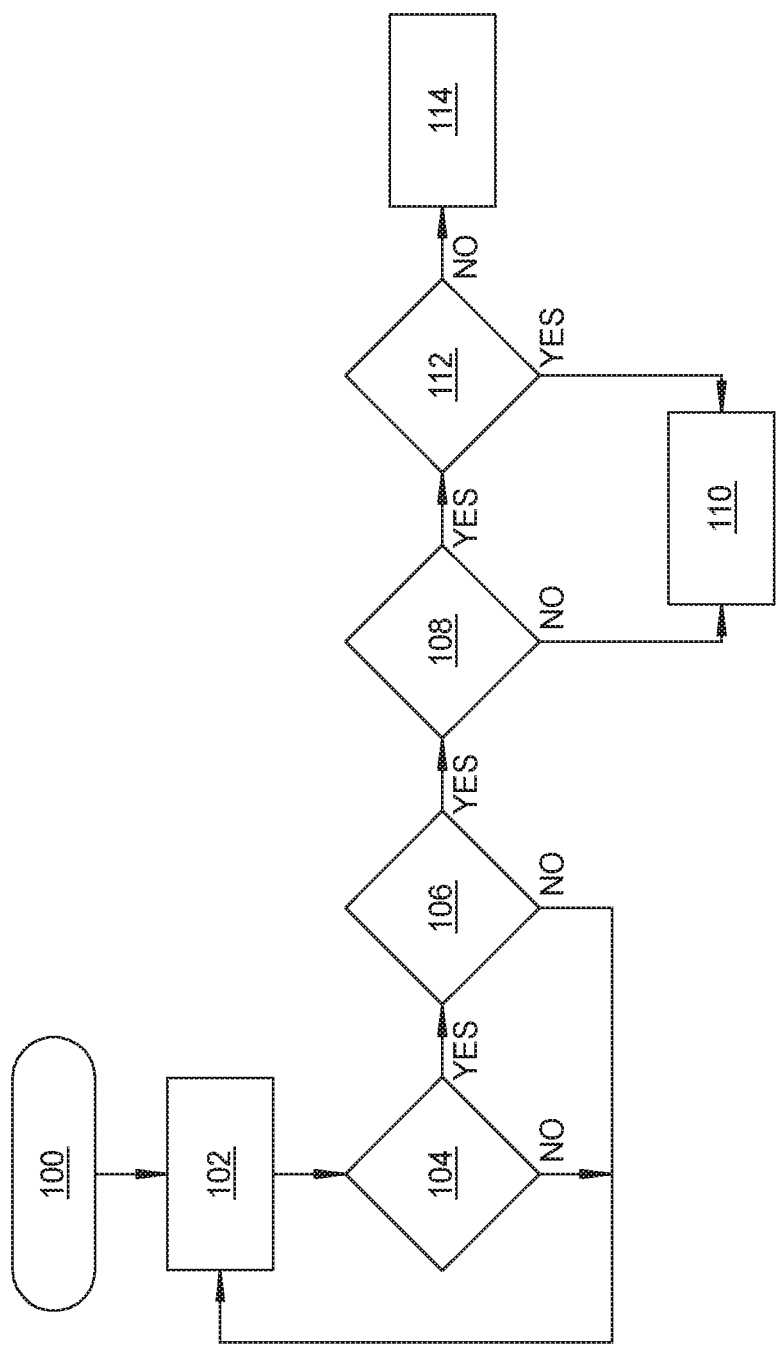

FIG. 1 is a schematic view of a vehicle having an electric motor drive system and a control system for determining whether an unexpected acceleration is due to an internal fault or external forces according to the principles of the present disclosure; and FIG. 2 is a flow diagram illustrating exemplary method steps for the method according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

With reference to FIG. 1, a vehicle 10 is schematically shown and includes an electric motor 12 for driving wheels 14 of the vehicle 10 via a gear reduction device 15. A control unit 16 receives a vehicle speed signal from a speed sensor 18 and a motor torque signal from a motor torque sensor 20. The control unit 16 provides control signals to the electric motor 12 via control line 21. The control unit 16 is also in communication with other input devices such as an accelerator pedal 22 and a brake pedal 24 for receiving driver inputs therefrom. The control unit 16 can take on various forms including but not limited to a processor unit, dedicated circuitry, various control modules and/or combinations thereof.

The vehicle 10 is capable of a one pedal drive mode that is controlled by the control unit 16 so that the accelerator pedal 22 input signal is used to control the electric motor operation in accelerating and maintaining vehicle speed as well as responding to the release of the accelerator pedal 22 for applying negative torque via the electric motor 12 to reduce the vehicle speed and to "hold" the vehicle 10 at a standstill without applying the vehicle brakes.

The control unit 16 can use input from the speed sensor 18 or other alternative sensors to determine vehicle acceleration at any given time.

With reference to FIG. 2, a method of the present disclosure is provided to analyze vehicle parameters to distinguish between whether an unexpected vehicle acceleration is due to an internal fault or external forces. The method uses a magnitude and direction of a change in acceleration for evaluating whether the unexpected acceleration is due to a potential system fault scenario or a potential crash scenario and then taking measures accordingly.

As shown in FIG. 2, the vehicle 10 achieves active "holding" in the one pedal drive mode, at step 100 of the control method. At step 102, monitoring is enabled for unintended vehicle motion. At step 104, it is determined whether an unexpected significant rate of change in acceleration is detected. A unexpected significant rate of change in acceleration can be determined for example, when the vehicle has accelerated without out a corresponding operator input directing the acceleration. If no significant rate of change in acceleration is determined at step 104, the control cycles back to step 102. If an unexpected significant rate of change in acceleration is detected at step 104, control advances to step 106 where it is determined if an unexpected change in holding torque is detected. The unexpected change in holding torque can be detected based upon input from the torque sensor 20. If not, the control cycles back to step 102. However, if an unexpected change in holding torque is detected at step 106, control advances to step 108 where it is determined if a change in the holding torque exceeds a predetermined threshold value. If not, the method advances to step 110 where the control unit 16 takes appropriate measures for a potential system fault scenario. Appropriate measures for a potential system fault scenario can include bringing the vehicle to a stop, applying the vehicle parking brake and/or disabling the vehicle operation. More specifically, for an internal fault that causes a system shutdown, the propulsion system can be shut down with 0 torque command and all actuators can be disabled while the controller is still awake. When the ignition key is turned off by the operator, a controller shutdown process begins. After a predetermined time (such as 5 seconds) an end of trip (EOT) process is triggered, during which the diagnostic system clears the fault status and the shutdown action is released as the remediation is triggered. After a certain period of time, the controller shuts down itself and a next controller cycle can be triggered by the vehicle key. If at step 108 it is determined that a change in the holding torque exceeds a predetermined threshold value, then control advances to step 112, where it is determined whether the change in holding torque is in a same direction as the vehicle travel. If at step 112 it is determined that the change in holding torque is in a same direction as the vehicle travel, then the control advances to step 110 where the control unit 16 takes appropriate measures for a potential system fault scenario, as discussed above. If at step 112 it is determined that the change in holding torque is not in a same direction as the vehicle travel, then the control advances to step 114 where the control unit 16 takes appropriate measures for a potential fault or vehicle crash scenario. Appropriate measures for a crash scenario can include allowing the vehicle to continue to operate while additional system evaluation is made. This would allow a driver to operate the vehicle to clear a roadway after a crash. After a first distance threshold is exceeded, the system can request engagement of an electric parking brake. After a second distance threshold is exceeded, the system can then request shift to park. The driver can then shift out of Park to move the vehicle. The driver can either disable the electric park brake manually or by accelerating the vehicle, which will disable the electric parking brake automatically.

The method of the present disclosure allows the control unit to differentiate an external disturbance from an internal force while operating in the one pedal drive mode by using the magnitude of the change in power flow, the direction of the change in power flow and a rate of change of acceleration to make this determination. Accordingly, the system prevents a shutdown remedial action if the vehicle's one pedal drive feature is active and an external disturbance such as a collision is detected. Accordingly, the system of the present disclosure uses the power flow magnitude and a direction of a change in the power flow to distinguish between external forces and internal faults. This distinction allows for more appropriate action whether to avoid invasive system shutdown versus appropriate immobilization mitigation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of analyzing vehicle parameters to distinguish between internal faults and external forces for a vehicle having an electric motor drive system operable to hold the vehicle stationary by applying a holding torque with the electric motor drive system without application of a braking system, comprising:
    determining if there is an unexpected significant rate of change in vehicle acceleration;
    based upon a determination that there is an unexpected rate of change in vehicle acceleration, determining whether there is a corresponding unexpected change in electric motor drive system holding torque above a predetermined level;
    based upon a determination that there is an unexpected change in electric motor drive system holding torque above a predetermined level, determining if a direction of the change in electric motor drive system holding torque is in a same direction as vehicle travel;
    based upon a determination that the direction of the change in electric motor drive system holding torque is in a same direction as vehicle travel, taking predetermined measures for evaluating a potential electric motor drive system fault scenario including at least one of bringing the vehicle to a stop and/or disabling the vehicle operation; and
    based upon a determination that the direction of the change in electric motor drive system holding torque is in an opposite direction as vehicle travel, taking predetermined measures for a potential vehicle crash scenario including allowing the vehicle to continue to operate, wherein the predetermined measures for a potential vehicle crash scenario differ from the predetermined measures for evaluating a potential electric motor drive system fault scenario.

2. The method according to claim 1, wherein the predetermined measures for a potential crash scenario including allowing the vehicle to continue to operate, further includes engaging a parking brake after a first distance threshold is exceeded.

3. The method according to claim 1, wherein the predetermined measures for a potential crash scenario including allowing the vehicle to continue to operate, further includes shifting the vehicle to park after a predetermined threshold distance is exceeded.

* * * * *